(12) United States Patent
Pradier et al.

(10) Patent No.: US 8,960,047 B2
(45) Date of Patent: Feb. 24, 2015

(54) DEVICE FOR COUPLING A GUIDE ELEMENT SECURED TO AT LEAST ONE CABLE SHEATH, IN A SUPPORT MOUNT

(75) Inventors: Philippe Pradier, Sorbiers (FR); Jerome Dhelft, Evry (FR); Julien Desgraz, Montgeron (FR)

(73) Assignee: Dura Automotive Systems SAS, Bievres (FR)

( * ) Notice: Subject to any disclaimer, the term of this patent is extended or adjusted under 35 U.S.C. 154(b) by 49 days.

(21) Appl. No.: 13/704,168

(22) PCT Filed: Jun. 9, 2011

(86) PCT No.: PCT/FR2011/051303
§ 371 (c)(1),
(2), (4) Date: Jan. 23, 2013

(87) PCT Pub. No.: WO2011/157925
PCT Pub. Date: Dec. 22, 2011

(65) Prior Publication Data
US 2013/0118284 A1    May 16, 2013

(30) Foreign Application Priority Data

Jun. 17, 2010    (FR) ..................................... 10 54795

(51) Int. Cl.
| | |
|---|---|
| *F16C 1/22* | (2006.01) |
| *F16C 1/12* | (2006.01) |
| *F16C 1/10* | (2006.01) |
| *F16H 61/36* | (2006.01) |

(52) U.S. Cl.
CPC . *F16C 1/12* (2013.01); *F16C 1/106* (2013.01); *F16H 61/36* (2013.01); *F16C 1/102* (2013.01); *F16C 2361/65* (2013.01)
USPC .......................................................... 74/502.6

(58) Field of Classification Search
USPC .................... 74/500.5, 501.5 R, 502.4, 502.6
See application file for complete search history.

(56) References Cited

U.S. PATENT DOCUMENTS

| | | | | |
|---|---|---|---|---|
| 5,253,543 A | * | 10/1993 | Carlson ..................... | 74/501.5 R |
| 6,092,436 A | * | 7/2000 | Wirsing et al. .............. | 74/502.4 |
| 6,318,207 B1 | * | 11/2001 | Asai et al. .................... | 74/502.6 |
| 2005/0160866 A1 | * | 7/2005 | Dona-Contero ............. | 74/502.6 |

FOREIGN PATENT DOCUMENTS

| | | |
|---|---|---|
| DE | 102007060538 A1 | 6/2009 |
| FR | 2927961 A1 | 8/2009 |
| FR | 2936852 A1 | 4/2010 |

OTHER PUBLICATIONS

International Search Report for PCT/FR2011/051303 dated Sep. 22, 2011.

* cited by examiner

*Primary Examiner* — Vicky Johnson
(74) *Attorney, Agent, or Firm* — Heslin Rothenberg Farley & Mesiti P.C.

(57) ABSTRACT

The guide element has two opposed hooks in alignment. One hook is positioned angularly so as to bear and butt in a recess formed in a support mount. An other hook bears on an elastic member of the mount so as to trigger pivoting movement of a tilting latch which engages with the other hook, under a tilting effect of the guide element that corresponds to a position of coupling with the support mount.

10 Claims, 6 Drawing Sheets

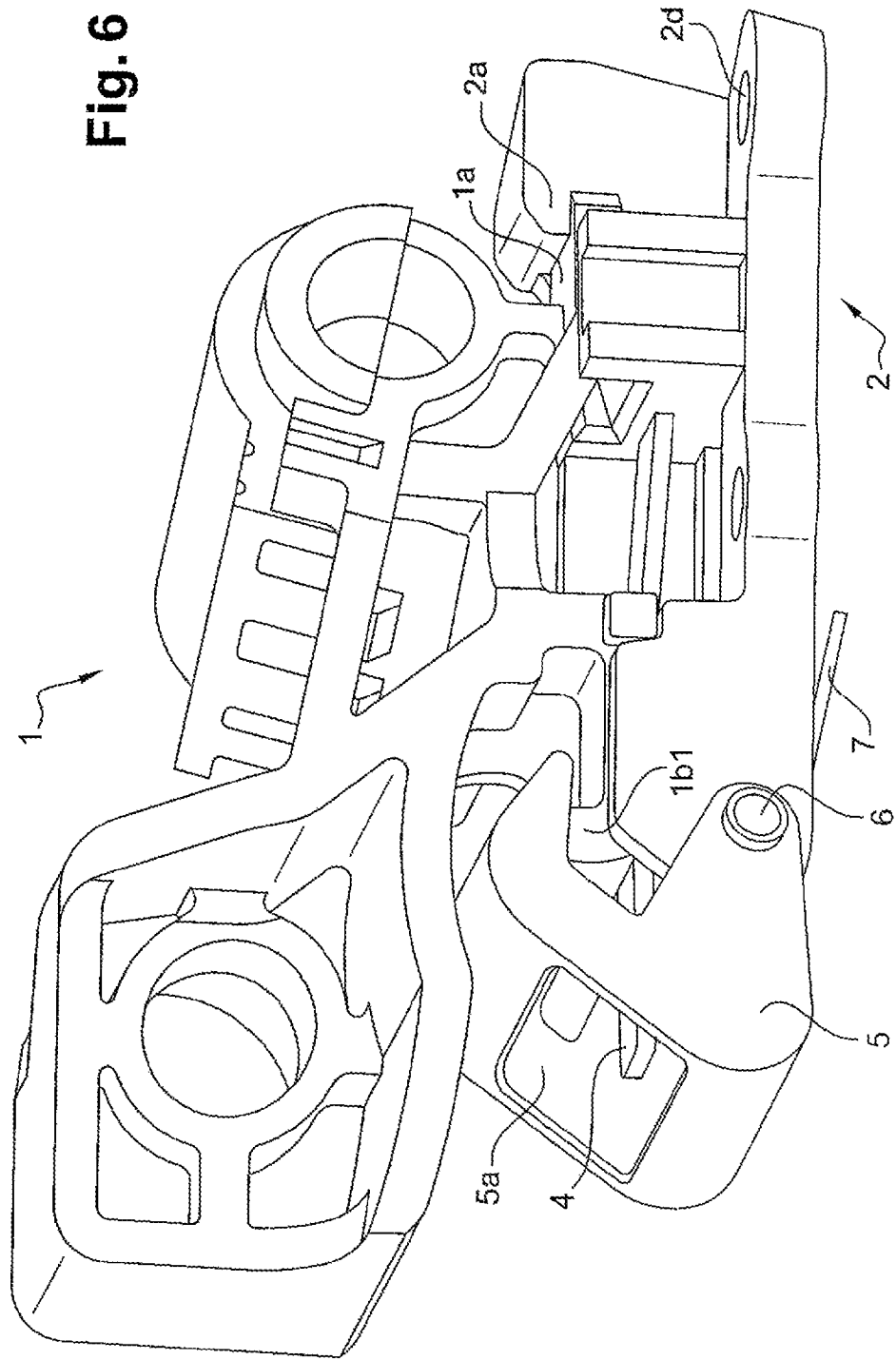

DEVICE FOR COUPLING A GUIDE ELEMENT SECURED TO AT LEAST ONE CABLE SHEATH, IN A SUPPORT MOUNT

CROSS REFERENCE TO RELATED APPLICATIONS

This application is a national stage filing under section 371 of International Application No. PCT/FR2011/051303 filed on Jun. 9, 2011, and published in French on Dec. 22, 2011 as WO 2011/157925 A1 and claims priority of French application No. 1054795 filed on Jun. 17, 2010, the entire disclosure of these applications being hereby incorporated herein by reference.

BACKGROUND ART

This invention relates to the technical sector of equipment for motor vehicles.

More particularly, the invention concerns fixing cable sheaths or suchlike, on a support mount fitted to a motor vehicle gearbox or to a control of a notably manual gearbox. The cables or suchlike can be used for transmitting any command, for example for selecting or shifting gears by means of a control lever. Generally, the cable sheath in question has a bush, an end-piece or other element, designed to be fixed in the support mount.

Different solutions have been proposed to perform this function.

In a simplified embodiment, the bush has a ring fitted, with a limited coaxial sliding capacity, against a return spring. The ring is set back in relation to a groove in the bush in order to engage in an indentation in the support mount. The bush is secured in the locking position, in the bottom of the groove, by a semi-circular boss formed concentrically at the bottom of the indentation which is rounded. The bush is therefore fixed as a result of a clipping effect which is achieved at the end of travel, i.e. after having fully engaged the bush in the bottom of the indentation. Ineffectual clipping cannot be ruled out, considering the working conditions of the operator, who usually cannot visually check that clipping has been properly achieved.

It also appeared important to be able to visually check whether, at the end of the chain, the fixing of the cable is properly achieved. If we consider the solution described by the prior art, it appears that if the clipping operation as such is not correctly achieved, the connection end-piece or suchlike, can nevertheless remain hooked to the support mount, without being securely coupled thereto. In other words, the operator, chosen to attempt an initial gear shift, will not notice that the coupling is poorly achieved and it is only the driver who, after several kilometers, will find that he can no longer shift gear, due to the cable being uncoupled.

In order to overcome these drawbacks, a solution emerges, for example, from the teaching of patent application FR 2.927.961, also owned by the present applicant.

According to the teaching of that patent application, a connection end-piece is vertically engaged in a top down movement, in an indentation in the mount. The bottom of the indentation has two pawls fitted so as to be able to pivot in relation to one another. The pawls are controlled by a member capable of being triggered by the effect of introducing the end-piece so as to cause pivoting by bringing together the pawls which engage with arrangements for retaining the end-piece, with a view to securing it in the bottom of the indentation.

Another solution is described in document FR 2.936.852, also belonging to the applicant. According to this solution, the connection end-piece is introduced coaxially into an opening in the mount. The end-piece is provided with an open ring fitted in the groove, in combination with arrangements to enable, under the coaxial introduction effort, the engagement of the said end-piece in the opening, after a reduction in the diameter of the ring. After passing through the opening, the ring returns to its original diameter corresponding to a locking position, in combination with a shoulder of the end-piece which serves as an end-stop.

BRIEF SUMMARY OF THE INVENTION

Based on this state of the art, the invention proposes another solution further improving the locking of the end-piece, the bush or other connection element of the cable in relation to the mount, always with the aim that, if the connection is not correctly achieved, the connection element automatically escapes from the support mount at the operator's first attempts to shift gear.

To solve such a problem, a device for coupling a guide or connection element secured to at least one cable sheath, in a support mount, has been developed. According to the invention, the guide element has two opposed hooks in alignment, one of which is intended to be positioned angularly so as to bear and butt in a recess formed in the support mount, while the other hook is designed to bear on an elastic member belonging to said mount so as to trigger the pivoting movement of a tilting latch which engages with said other hook, under a tilting effect of said guide element that corresponds to a position of coupling with the support mount.

To solve the problem of ensuring the coupling as such, the tilting latch is mounted on a shaft at the end of the mount and subject to a spring to return it to the closed position against the elastic member of said mount which keeps said latch in an open position.

In order to solve the problem of keeping the tilting latch in the armed position, the elastic member of the mount is a spring-loaded blade secured, at one of its ends, to the bearing part of the mount forming the recess engaging with one of the hooks, the other end of said blade keeping the tilting latch in the open position.

According to other characteristics, the blade is positioned perpendicular to the pivot axis of the tilting latch. The two hooks are formed by two squared tabs facing in two opposite directions. The recess of the mount has a T-squared cross-section to encompass the hook.

Bearing in mind the characteristics that form the basis of the invention, the mount has, upstream of the recess and as an extension thereof, a bearing and centering area for the corresponding hook.

The locking of the guide element, with a view to immobilising it, is achieved by an angular engagement of the said element and a bearing against the recess of the mount by one of its hooks, then by a downward tilting of said element, so that the other hook bears on the spring-loaded blade causing, concurrently, the pivoting into the closed position of the latch which bears against the said other hook.

As indicated, the invention is usefully applied in the technical sector of motor vehicles. To this end, the mount is fixed to the gearbox of a motor vehicle, while the guide element forms a sheath end-piece of a cable for shifting and/or selecting gears.

In order to solve the problem of uncoupling, if necessary, the support mount cable, the tilting latch has, at its base, a slot for engaging a tool such as a screwdriver, in order to rearm the said latch in an open position by bearing down on the spring-loaded blade.

BRIEF DESCRIPTION OF THE DRAWING FIGURES

The invention is described below in further detail with the aid of the accompanying drawings, in which:

FIG. 6 is a perspective view in the position of coupling of the connection element with the mount.

DETAILED DESCRIPTION

Figure 1:
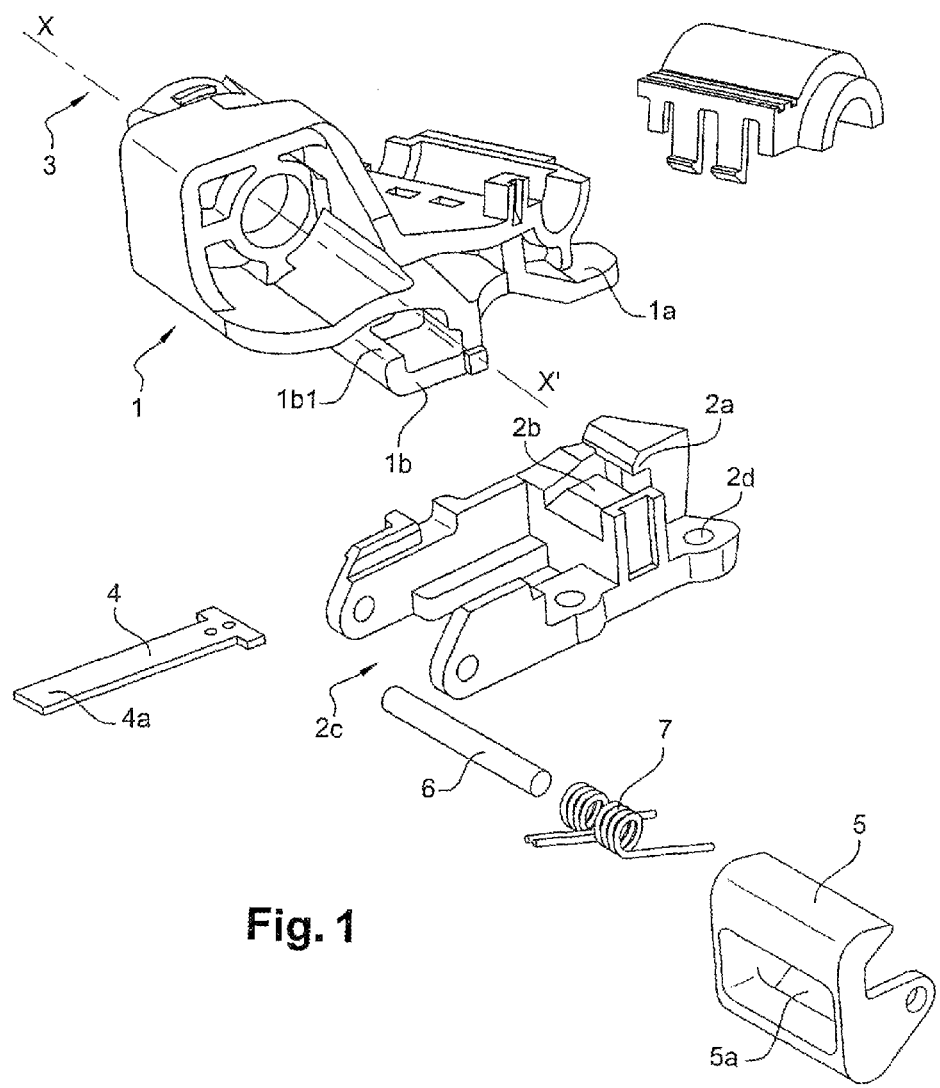
FIG. 1 is a perspective view showing, before coupling, the guide and connection element of the cable or cables and the support mount whose constituent parts are shown before assembly.
Figure 2:
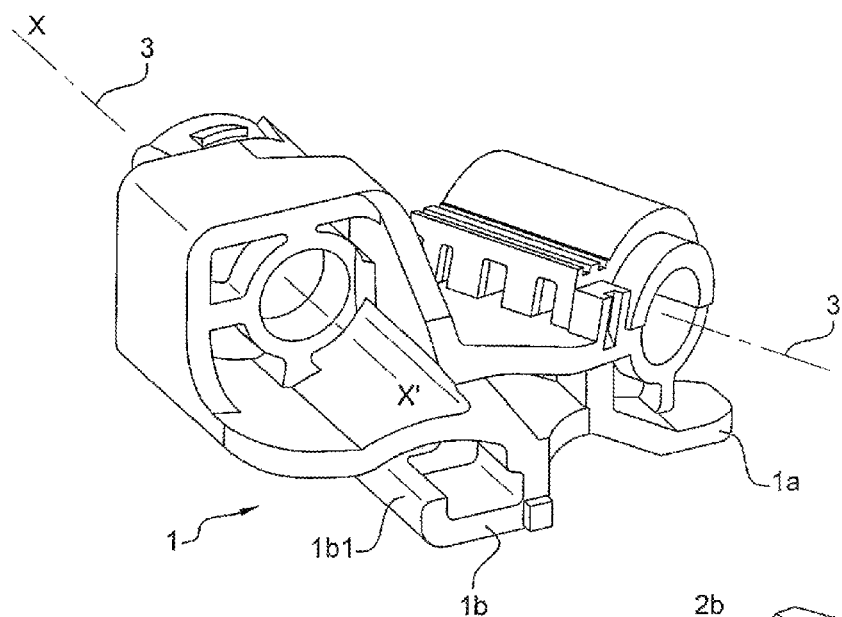
FIG. 2 is a view corresponding to FIG. 1 after assembling the constituent parts of the support mount.
Figure 2:
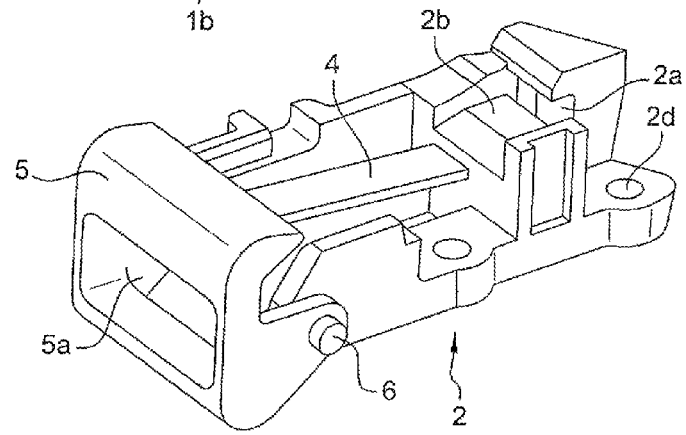

As stated, the invention concerns a device for coupling a guide and connection element (1) in a support mount (2). The guide and connection element (1) is secured by any known and appropriate means, to the sheath of one or more cables, symbolised by the dot-dash line (3).

The device is usefully applied in the motor vehicle sector and, more particularly, in the field of transmission by cables for shifting or selecting gears. To this end, the mount (2) has arrangements (2d) so as to be fixed by any known and appropriate means onto a part of the gearbox. The connection element (1) has two hooks (1a) and (1b) in alignment. These two hooks are formed by two squared tabs facing in two opposite directions. Hook (1b) may have a heel (1b1).

Hook (1a) is designed to be positioned so as to bear and butt in a recess (2a) formed in the support mount (2). This recess (2a) has a T-squared cross-section to encompass, as will be indicated later in the description, the free end of the hook (1a). Upstream of the recess (2a), the support mount (2) has an area (2b) for guiding the hook (1a).

The other hook (1b) is designed to bear on an elastic member (4) belonging to the mount (2) so as to trigger the pivoting movement of a tilting latch (5) which engages with said hook (1b), under a downward tilting effect of said connection element (1) that corresponds to a position of coupling with the support mount (2), as will be indicated later in the description. The tilting latch (5) is mounted at the end of the mount (2), opposite the recess (2a) on an articulation axis (6) fitted, for example, into a part of the mount (2) acting as a clevis (2c). The pivot axis (6) of the latch (5) is subject to a spring (7) to return to the closed position against the elastic member (4) which is designed to keep the latch (5) in the open position.

The elastic member (4) is formed by a spring-loaded blade, secured at one of its ends to the bearing part (2b) of the mount. The free end (4a) of the blade (4) keeps, as indicated, the latch (5) in the open position against the return spring (7) corresponding, consequently, to a so-called "armed" position of the latch (5). The blade (4) is positioned perpendicular to the pivot axis (6) of the latch (5).

The operation of the device with a view to coupling the cable or cables, provided with the connection element or elements (1), to the mount (2) is performed under the conditions described below, with reference to FIGS. 3, 4 and 5.

Figure 3:
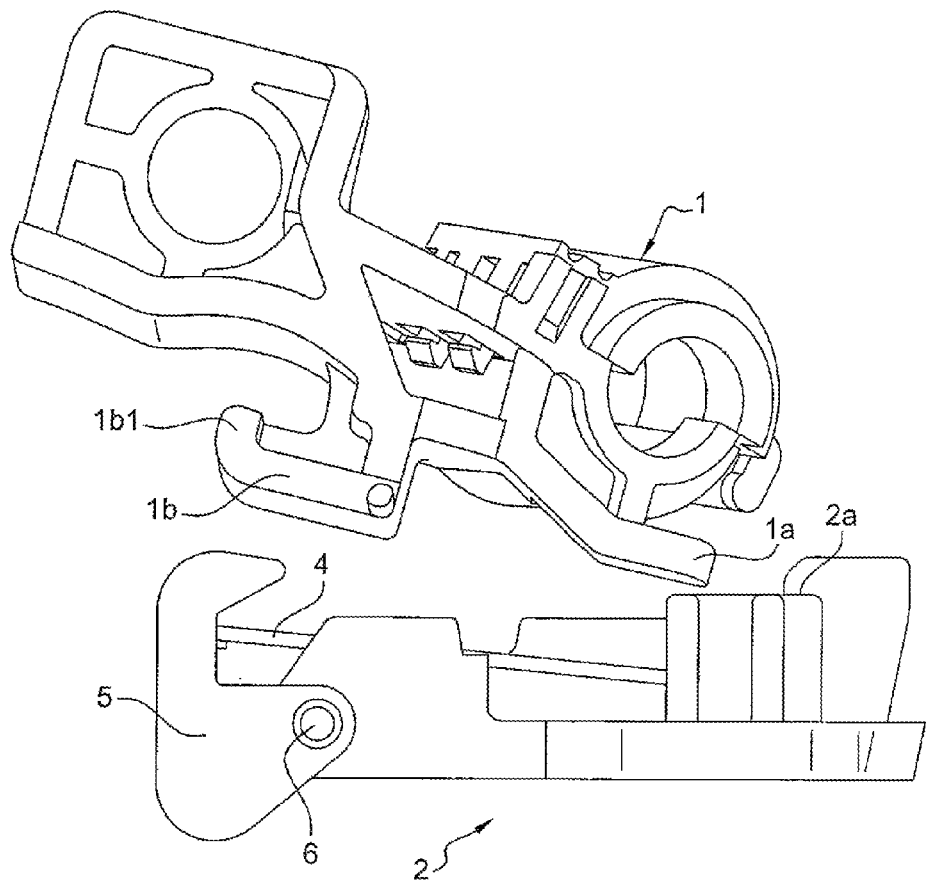
FIGS. 3, 4 and 5 show the principle of coupling of the connection element of the cable or cables in relation to the mount according to the characteristics of the device according to the invention.
Figure 4:
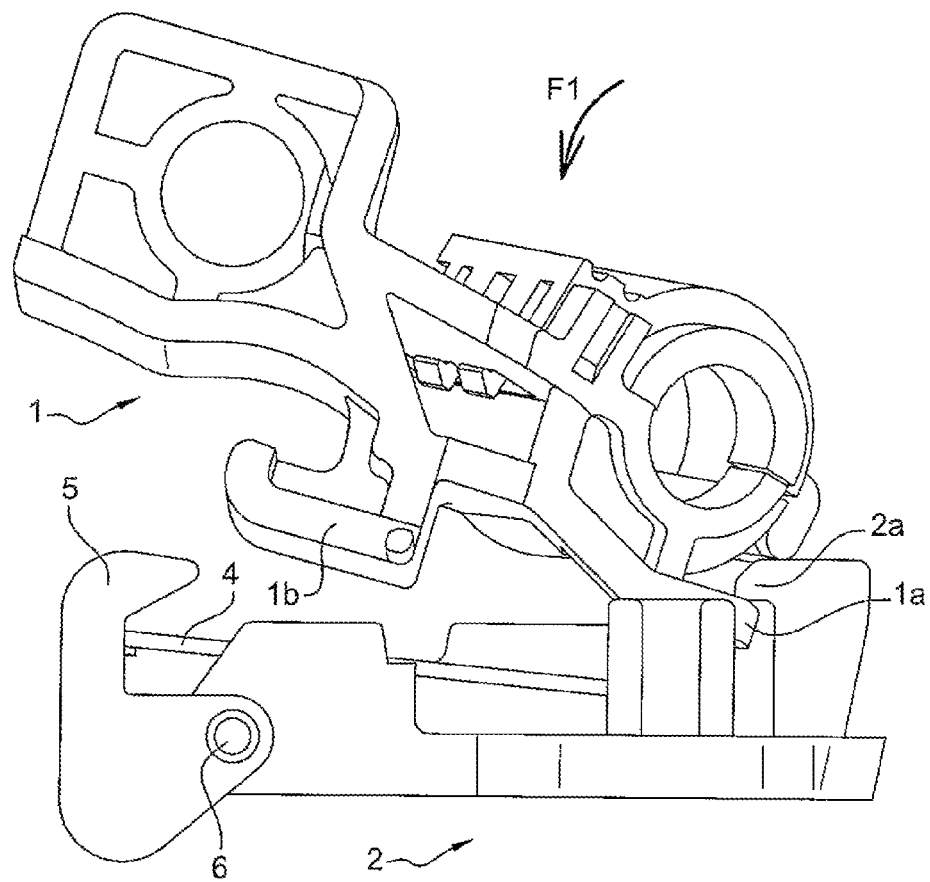
Figure 5:
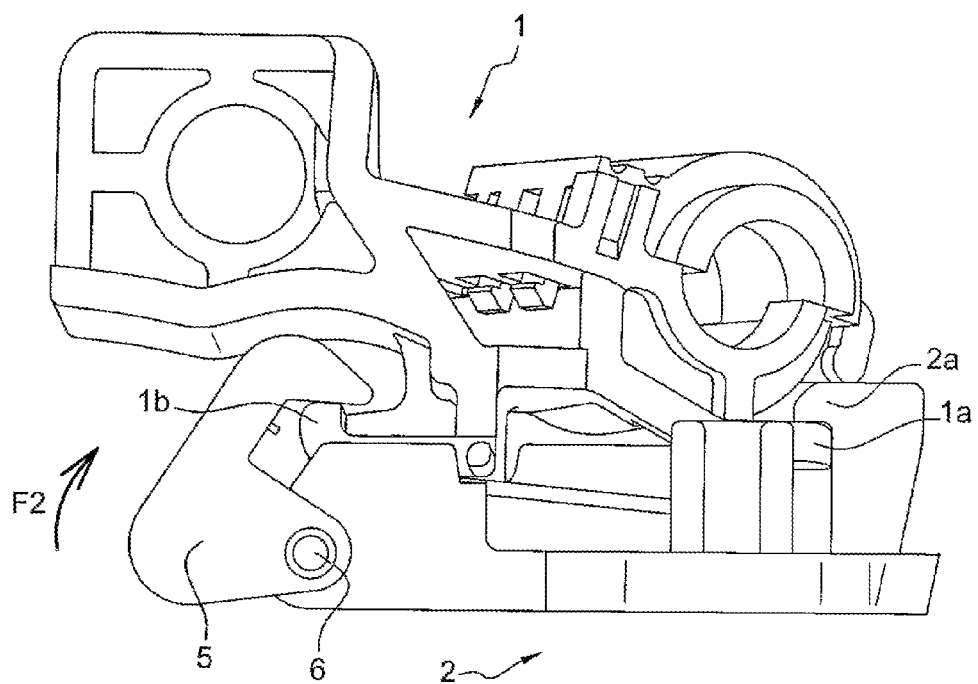

As FIGS. 3 and 4 show, the connection element (1) with the cable or cables, is positioned angularly in order to engage the hook (1a) in the guide area (2b) so as to bear against the recess (2a). The connection element (1) is then tilted downwards (Arrow F1), so that the hook (1b) bears against the blade (4). Under this bearing effect (F1), the blade (4) is pressed down, consequently freeing the latch (5) which, under the effect of releasing the return spring (7) of the pivot axis (6) angularly pivots (Arrow F2) to trap the hook (1b) behind the heel (1b1) (FIG. 5). The connection element (1) is thus immobilized and locked in the mount (2) (FIG. 6).

It emerges from these arrangements that, if the connection element (1) is not correctly locked in the mount, a traction effort exerted on the cable or cables will immediately cause the uncoupling of the connection element (1) in relation to the mount (1) at the first attempt by the operator.

In this regard, it should be noted, in a preferred manner, that the connection element (1) can be accommodated so that the fixing of the sheaths or cables is arranged at an angle and in particular perpendicular to the longitudinal axis x-x' of the mount, enabling said element (1) to escape even more easily from the mount (2), if the locking is not correctly performed.

After total locking and immobilization of the connection element (1) in the mount (1), in the conditions indicated above, it is possible, if necessary, to uncouple the connection piece (1).

To achieve this, simply engage through a slot (5a) in the latch (5), any tool, in particular the blade of a screwdriver, in order to rearm the said latch (5) in the open position, by bearing upon the spring-loaded blade (4).

The advantages emerge clearly from the description.

The invention claimed is:

1. Coupling device comprising a guide element adapted to be secured to at least one cable sheath, and a support mount, wherein the guide element has a first hook and a second hook in alignment and facing in opposite directions, and the support mount has a recess adjacent a first end, a tilting latch pivotally mounted at an opposite second end, and an elastic member operatively engaging the tilting latch, the first hook being positioned angularly so as to bear and butt in the recess of the support mount, while the second hook bears on the elastic member of said mount so as to trigger pivoting movement of the tilting latch which engages with said second hook, under a tilting effect of said guide element that corresponds to a position of coupling of the guide element with the support mount.

2. Device according to claim 1, wherein the tilting latch is mounted on a shaft at the second end of the mount and subject to a spring to return the latch to a closed position, and the elastic member of said mount serves to keep said latch in an open position until the second hook bears on the elastic member.

3. Device according to claim 2, wherein the elastic member of the mount comprises a spring-loaded blade secured, at one end, to a bearing part of the mount forming the recess for engaging with the first hook, ran opposite end of said blade keeping the tilting latch in an open position until the second hook bears on the elastic member.

4. Device according to claim 3, wherein locking of the guide element, for immobilising the guide element in the mount, is achieved by an angular engagement of the said guide element and a bearing against the recess of the mount by the first hook, then by a downward tilting of said guide element, so that the second hook bears on the spring-loaded blade causing, concurrently, pivoting into a closed position of the latch which bears against said second hook.

5. Device according to claim 3, wherein the tilting latch has a slot in a base of the latch for passage of a tool, in order to rearm said latch in an open position by bearing upon the spring-loaded blade.

6. Device according to claim 3, wherein the blade is positioned perpendicular to a pivot axis of the tilting latch.

7. Device according to claim 1, wherein the first hook and second hook comprise two squared tabs facing in said opposite directions.

8. Device according to claim 1, wherein the recess of the mount has a T-squared cross-section to encompass the first hook.

9. Device according to claim 1, wherein the mount has, upstream of the recess and as an extension thereof, a bearing and centering area for the first hook.

10. Device according to claim 1, wherein the mount is adapted to be fixed to a motor vehicle gearbox or to a control of a gearbox, and the guide element is adapted to be secured to the cable sheath of a cable for shifting and/or selecting gears.

* * * * *